July 7, 1964 G. I. ROBERTS 3,139,921
METHOD AND APPARATUS FOR FORMING END TURNS ON A WIRE WOUND UNIT
Filed March 6, 1961 3 Sheets-Sheet 2

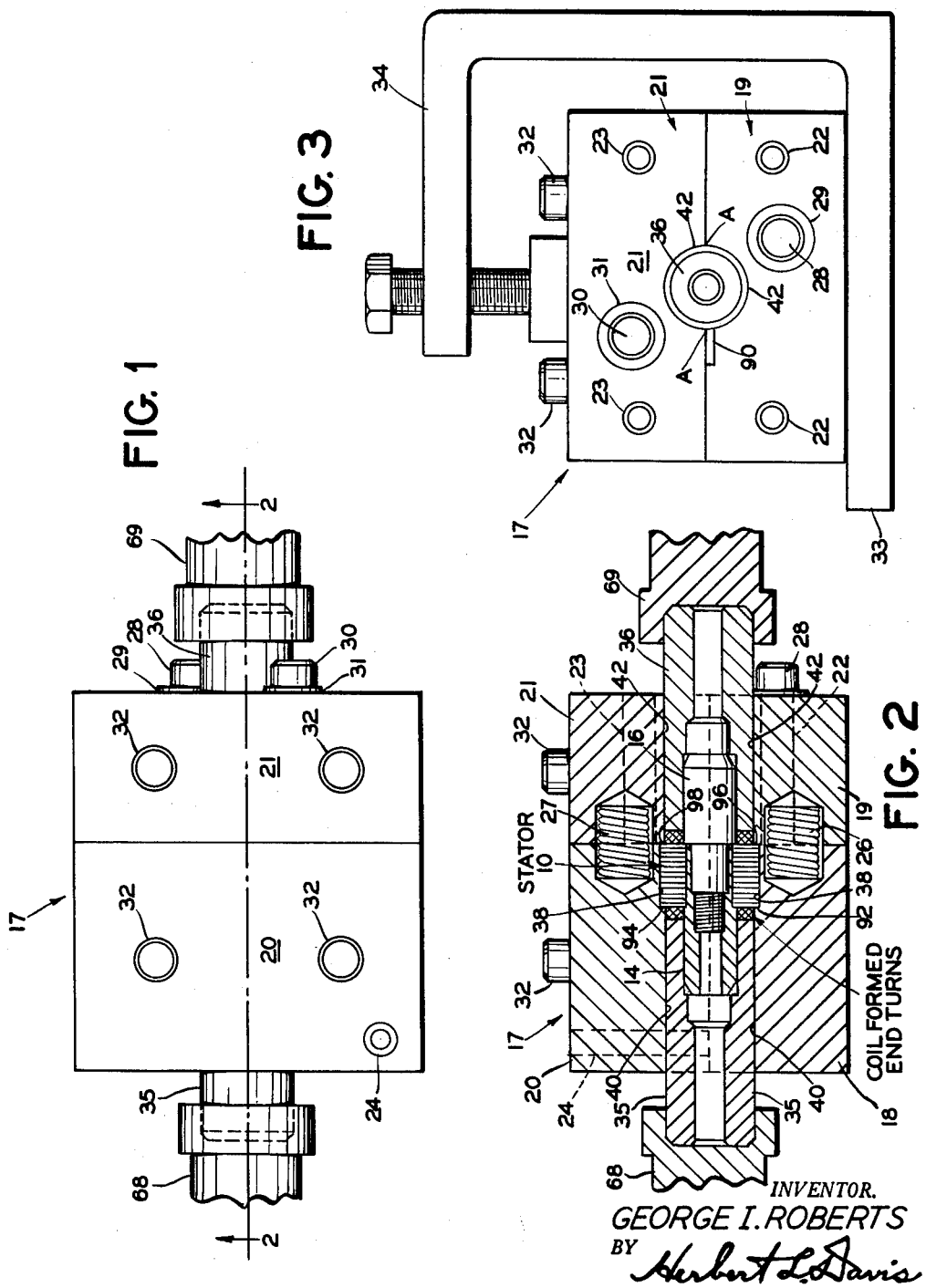

INVENTOR.
GEORGE I. ROBERTS
BY
ATTORNEY

INVENTOR.
GEORGE I. ROBERTS
BY Herbert L. Davis
ATTORNEY

United States Patent Office  3,139,921
Patented July 7, 1964

3,139,921
METHOD AND APPARATUS FOR FORMING END TURNS ON A WIRE WOUND UNIT
George I. Roberts, Maywood, N.J., assignor to The Bendix Corporation, Teterboro, N.J., a corporation of Delaware
Filed Mar. 6, 1961, Ser. No. 93,618
3 Claims. (Cl. 153—10)

The invention relates to a novel method and apparatus for forming end turns on a stator or wire wound unit of a type wherein it is necessary to form the same to a specified dimension; that is, to form end turns in the shape of a ring having specified dimensions with reference to inside and outside diameters and thickness.

An object of the invention is to provide a novel method to facilitate end turn forming by utilization of a novel split bearing instead of a "Jacobs" collet, as in U.S. application Serial No. 666,569, filed June 19, 1957, by George I. Roberts, and now U.S. Patent No. 2,982,330, granted May 2, 1961, and assigned to The Bendix Corporation, with the attendant advantages in simplicity and ease in applying the method of the present invention.

Another object of the invention is to provide a novel apparatus for compressing end turns of wire wound coils about the ends of a stator or wire wound unit.

Another object of the invention is to provide a novel means whereby the outside diameter of the end turns of a wire wound unit may be controlled by a pair of split bearings; the inside diameter by suitable forming elements; and the thickness or height of the end turns by the pressure applied to suitable ram elements.

Another object of the invention is to provide a novel method and means for forming a large mass of end turns.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 4:
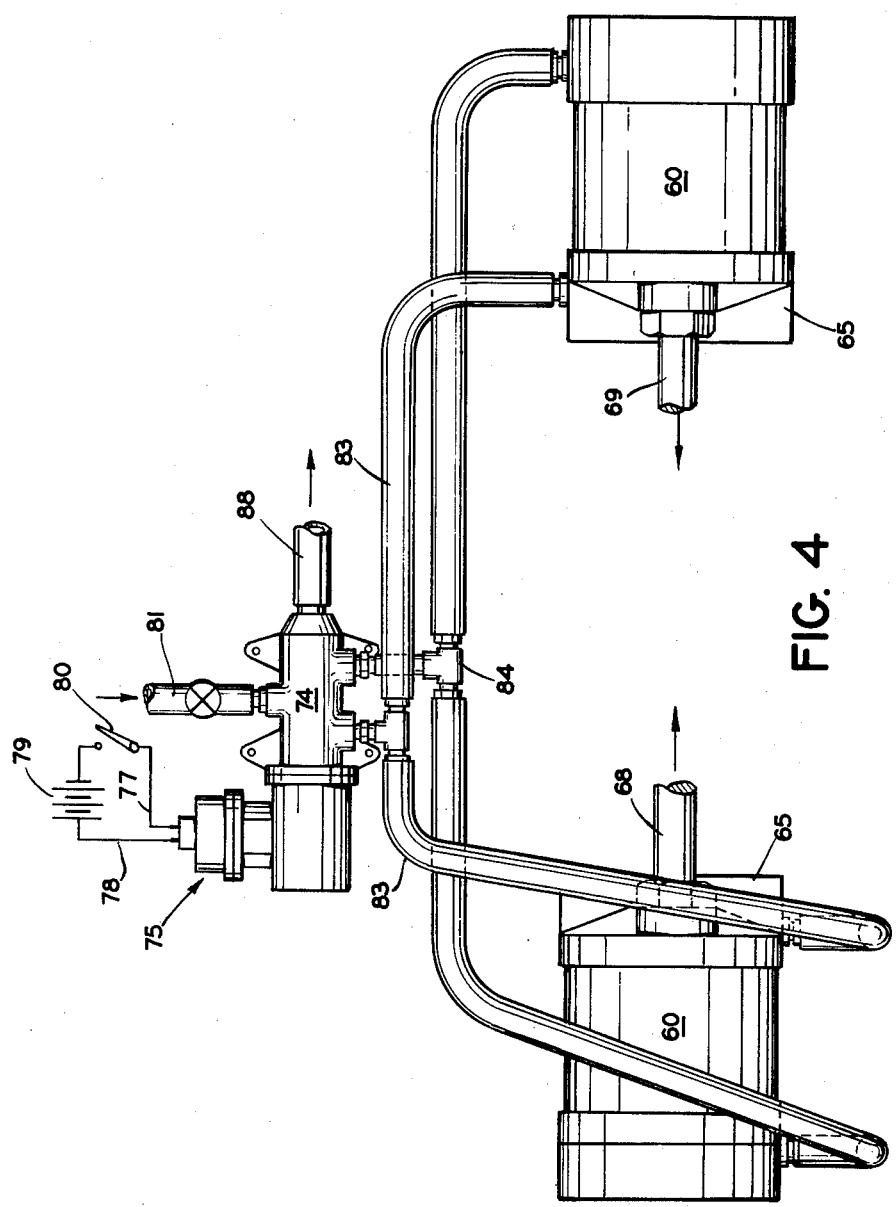
Figure 7:
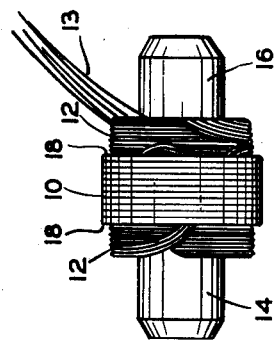
Figure 6:
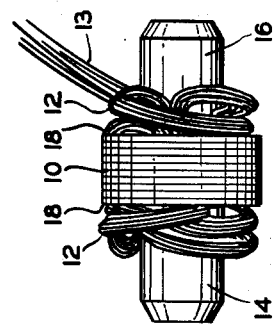
Figure 5:
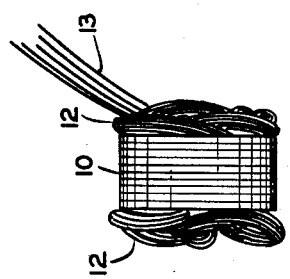

In the drawings:
FIGURE 1 is a top plan view of the novel split bearing apparatus.
FIGURE 2 is a fragmentary sectional view of FIGURE 1 taken along the lines 2—2 and showing the apparatus for forming end turns on a wire wound unit, with pressure rams of the type disclosed in the aforenoted U.S. Patent No. 2,982,330 shown in an operative position.
FIGURE 3 is an end view of the apparatus of FIGURE 1 with the apparatus shown clamped to a mounting plate.
FIGURE 4 is a view illustrating an air control valve and operative hook up for the air pistons of the wire end turn forming apparatus.
FIGURE 5 illustrates a typical electromagnetic core in an initially wound condition.
FIGURE 6 illustrates the core of FIGURE 5 after forming elements have been assembled therein and the windings have been initially compressed about the same.
FIGURE 7 illustrates the assembly of FIGURE 6 after the windings thereon have been processed in the end turn forming apparatus.

Referring to the drawing of FIGURE 5, a stator or conventional laminated magnetic core 10 is initially wound, wedged and connected as shown in the drawing so as to provide wire end turn windings 12 having connecting leads 13. Forming elements or studs 14 and 16 are then assembled as shown in FIGURE 6 and the wire end turns 12 are then formed to a diameter less than the outside diameter of the finished coil form by means of hand pliers. The hand plier operation is desirable since it is necessary to avoid pinching of the wires of the end turns at points A of FIGURE 3 when the upper and lower sections of the split bearing 17 of the end turning fixture are placed in position, as will be described hereinafter.

With reference to the end turning fixture 17 of FIGURE 2, the main portion of the fixture contains a split bearing which is composed of parts 18–19 of a lower section and parts 20 and 21 of an upper section. Each section is split into the respective parts in order to provide adjusting means for clamping the stator or wire wound unit which may vary plus or minus .007 of an inch in dimensions.

The part 18 has projecting from the surface thereof adjacent the part 19 a pair of locating pins 22 slidably mounted in precision holes formed in the part 19 for accurately locating the part 19 relative to the part 18. The part 20 has a similar pair of locating pins 23 slidably mounted in precision holes formed in the part 21 for accurately locating the part 21 relative to the part 20. The part 18 has an additional locating pin 24 projecting from the surface of the part 18 adjacent the part 20 and slidably mounted in a precision hole formed in the part 20 so as to accurately locate the upper section of the split bearing 17 relative to the lower section.

Further the parts 18 and 19 of the lower section and the parts 20 and 21 of the upper section are spring-loaded respectively by springs 26 and 27. The parts 18 and 19 may be clamped together by means of a screw 28 and washer 29, while the parts 20 and 21 may be clamped together by means of a screw 30 and washer 31. The screws 28 and 30 project through the parts 19 and 21 and screw threadedly engage in the parts 18 and 20 respectively. The upper and lower sections are in turn clamped together by screws 32 which project through the parts 20 and 21 of the upper section and screw threadedly engage in the parts 18 and 19, respectively, of the lower section so that the split bearing 17 may be so assembled as to limit the outer diameter of the end turns to the required dimensions, as hereinafter explained.

The split bearing 17 may be removably fastened to a mounting plate 33 by a clamp 34, as shown in FIGURE 3, and there is further slidably mounted in the split bearing 17 rams 35 and 36 which form a slide fit in the split bearing 17 and are moved in towards the wire end turns 12 of the laminated core 10 to form the end turns to a required height.

The lower and upper parts 18 and 20 of the split bearing 17 define a bore 38 for receiving the laminated core 10 and a second bore 40 having a smaller diameter for receiving the ram 35 while the lower and upper parts 19 and 21 of the split bearing 17 define a bore 42 of the same diameter as bore 40 for receiving the ram 36.

The rams 35 and 36 are slidably mounted in the respective bores 40 and 42 of the split bearing 17 and may be arranged for semi-automatic operation by providing switches and air cylinders or other mechanical means similar to that disclosed in the U.S. Patent No. 2,982,330 in which after insertion of the stator assembly in the split bearing 17, as shown in FIGURE 2, there may be provided, as shown in FIGURE 4, a pair of air cylinders, one at each end to inwardly actuate the rams 35 and 36 relative to the split bearing 17 so as to form the end turns of the windings 12.

Thus, as shown in FIGURE 4, on each side of the plate 33, there are located air cylinders 60 which are affixed to separate mounting plates 65. Rigidly connected to pistons 68 and 69 of the air cylinders 60 are the two (2) rams 35 and 36. One end of each of these rams 35 and 36 is bored out for a slide fit over the elements 14 and 16, the surfaces of which form the inside diameter of the windings 12. The outside diameter of the rams 35 and 36 is the same as the specified outside diameter of the end turn windings 12 formed by the surfaces of the bores 40 and 42. The rams 35 and 36 form a slidable fit in the bores 40 and 42, respectively, of the split bearing 17.

With reference to the drawing of FIGURE 4, there is indicated by the numeral 74 an air valve of conventional type controlled by a solenoid 75 operatively connected by electrical conductors 77 and 78 to a source of electrical energy 79 through a switch 80, shown diagrammatically in FIGURE 4. The solenoid operated air valve 74 is connected to inlet line pressure by a conduit 81 while outlet pressure conduits 83 and 84 lead from the air valve 74 to the air cylinders 60 to effect operation of the pistons 68 and 69 in an outward sense upon energization of the solenoid 75 and operation of the pistons 68 and 69 in an opposite sense upon deenergization of the solenoid 75. A conduit 88 leads from the air valve 74 to exhaust fluid pressure medium from one side or the other of the pistons 68 and 69 in cooperation with the operative air pressure at the opposite side of the pistons as directed by the air valve 74 so as to effect the operation of the rams 35 and 36, as heretofore explained.

*Operation*

In the operation of the end turn forming fixture 17, the forming elements 14 and 16 are initially inserted in the laminated core of the completely wound unit 10, as shown in FIGURE 6. The end turn coils of the windings 12 are then formed to an outer diameter less than the outside diameter of the formed finished coils by means of hand pliers. The hand plier operation is desirable since it is necessary to avoid pinching of the wires of the end turns 12 at the points A of FIGURE 3 when the upper and lower sections of the split bearing 17 of the end turning fixture are placed in position.

After the hand plier operation, the assembly of the core 10, windings 12 and forming elements 14 and 16 is then placed in position between the parts 18 and 19 of the lower section of the split bearing 17 with connecting leads 13 of the winding 12 placed in a slot 90 provided in the part 19 of the lower section. The slot 90 is formed in the surface of the part 19 adjacent the part 21 of the upper section and the slot 90 further extends along the surface of the part 19 adjacent the surface defining the bore 42 so as to open at the end surface of the part 19, as shown by FIGURE 3.

The parts 20 and 21 of the upper section of the split bearing 17 are then placed over the assembly of the core 10, windings 12 and forming elements 14 and 16 whereupon the end clamping screws 28 and 30 are then tightened pulling the parts 18 and 19 of the lower section and the parts 20 and 21 of the upper section together compressing springs 26 and 27 until inner shoulders 92 and 94 of the lower and upper parts 18 and 20 bear against one face of the laminated core 10 and inner shoulders 96 and 98 of the lower and upper parts 19 and 21 bear against the other face of the laminated core 10, as best shown by FIGURE 2. The four top clamping screws 32 are then tightened to hold the upper and lower sections of the split bearing 17 together.

The split bearing 17 is then in an operative relation to the core assembly so as to provide means for holding the outer diameter of the end turns of the windings 12 to specified dimensions while the forming elements or plugs 14 and 16 in the assembly provide means for holding the inner diameter of the end turns of the windings 12 to specified dimensions.

The rams 35 and 36 are then slidably inserted in the respective bores 40 and 42 of the split bearing 17. As heretofore explained, the rams 35 and 36 are operatively connected to the pistons 68 and 69, respectively, as shown in FIGURE 4, so that upon closure of the switch 80 air cylinders 60 are effective to press the rams 35 and 36 inwardly relative to the split bearing 17 so as to form the end turns of the windings 12 to the proper height under the force applied to the pistons 68 and 69 by the air cylinder 60, as best shown by FIGURE 2.

The inward movement of the rams 35 and 36 and the thickness or height of the end turns of the windings 12 are effectively controlled or limited to a predetermined dimension by a specified applied pressure on air cylinders 60. The outer diameter of the end turns of the windings 12 are effectively limited by the surfaces of the bores 40 and 42 defined by the parts 18 and 20 and the parts 19 and 21 of the split bearing 17 while the inner diameter of the end turns of the windings 12 are effectively limited by the surfaces of the forming elements 14 and 16 so as to complete the forming of the end turn windings as shown by FIGURE 7.

Although only one embodiment of the invention has been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. An apparatus for compressing wires at opposite ends of a circular core; comprising a pair of split bearings, means for supporting the wire turns at opposite ends of the core, one of said split bearings having a first bore for receiving the circular core and a second bore of smaller diameter than the first bore, the other of said split bearings having a third bore of said smaller diameter, means slidably mounted in said second and third bores for applying compressive forces to the wire turns at the opposite ends of the core so as to cause said wire turns to be axially compressed within said second and third bores to an outer diameter which is effectively limited by said second and third bores to said smaller diameter, and said first-mentioned supporting means including forming elements to limit the inner diameter of the compressed wire turns at the opposite ends of said core.

2. An apparatus for compressing wires at opposite ends of a circular core; comprising a pair of split bearings, means for supporting the wire turns at opposite ends of the core, one of said split bearings having a first bore for receiving the circular core and a second bore of smaller diameter than the first bore, the other of said split bearings having a third bore of said smaller diameter; each of said split bearings including an upper section and a lower section, means for clamping the lower sections of said pair of split bearings together, other means for clamping the upper sections of said pair of split bearings together, and additional means for clamping the upper and lower sections of said split bearings together and said core in fitting relation within said first bore; pressure rams slidably positioned in said second and third bores for applying compressive forces to the wire turns at the opposite ends of the core so as to cause said wire turns to be axially compressed within said second and third bores to an outer diameter equivalent to the smaller diameter of said second and third bores.

3. An apparatus for compressing wires at opposite ends of a circular core; comprising a pair of split bearings, means for supporting the wire turns at opposite ends of the core, one of said split bearings having a first bore for receiving the circular core and a second bore of smaller diameter than the first bore, the other of said split bearings having a third bore of said smaller diameter; each of said split bearings including an upper section and a lower section, means for clamping the lower sections of said pair of split bearings together, other means for clamping the upper sections of said pair of split bearings together, and additional means for clamping the upper and lower sections of said split bearings together and said core in fitting relation within said first bore;

pressure rams slidably positioned in said second and third bores for applying compressive forces to the wire turns at the opposite ends of the core so as to cause said wire turns to be axially compressed within said second and third bores to an outer diameter equivalent to the smaller diameter of said second and third bores; said first-mentioned supporting means including forming elements carried by said core and projecting into the second and third bores in spaced relation thereto, each of said pressure rams having a bore for receiving an end of said forming elements during the application of said compressive forces to the wire turns through said rams, and said forming elements limiting the inner diameter of the compressed wire turns at the opposite ends of said core.

References Cited in the file of this patent

UNITED STATES PATENTS

| | | |
|---|---|---|
| 2,199,623 | Elsey | May 7, 1940 |
| 2,226,398 | Cristiano et al. | Dec. 24, 1940 |
| 2,682,021 | Elmen | June 22, 1954 |
| 2,721,284 | Elmer | Oct. 18, 1955 |